(12) United States Patent
Vetters et al.

(10) Patent No.: US 8,727,699 B2
(45) Date of Patent: May 20, 2014

(54) ROTATING MACHINERY WITH DAMPING SYSTEM

(75) Inventors: Daniel Kent Vetters, Indianapolis, IN (US); Timothy Hoffmann, Greenwood, IN (US); Steven Arlen Klusman, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 727 days.

(21) Appl. No.: 12/904,730

(22) Filed: Oct. 14, 2010

(65) Prior Publication Data

US 2011/0171012 A1 Jul. 14, 2011

Related U.S. Application Data

(60) Provisional application No. 61/290,702, filed on Dec. 29, 2009.

(51) Int. Cl.
| | |
|---|---|
| *F01D 25/00* | (2006.01) |
| *F01D 25/16* | (2006.01) |
| *F01D 5/26* | (2006.01) |
| *F01D 25/04* | (2006.01) |
| *F16C 19/14* | (2006.01) |
| *F16C 27/04* | (2006.01) |

(52) U.S. Cl.
CPC ............ *F01D 25/164* (2013.01); *F01D 5/26* (2013.01); *F01D 25/04* (2013.01); *F16C 19/14* (2013.01); *F16C 27/045* (2013.01); *F16C 2360/23* (2013.01)

USPC ............... 415/33; 415/34; 415/109; 415/112; 415/113; 415/119; 415/142; 415/180; 415/229

(58) Field of Classification Search
CPC ......... F01D 25/164; F01D 5/26; F01D 25/04; F16C 19/14; F16C 27/045; F16C 2360/23
USPC ............. 415/33, 34, 109, 110, 111, 112, 113, 415/119, 142, 170.1, 180, 229; 384/99
See application file for complete search history.

(56) References Cited

U.S. PATENT DOCUMENTS

| | | | |
|---|---|---|---|
| 4,289,360 A | 9/1981 | Zirin | |
| 4,872,767 A | 10/1989 | Knapp | |
| 4,952,076 A | 8/1990 | Wiley, III et al. | |
| 5,080,499 A | 1/1992 | Klusman et al. | |
| 5,201,585 A | 4/1993 | Gans et al. | |
| 5,344,239 A | 9/1994 | Stallone et al. | |
| 6,910,863 B2 | 6/2005 | Scardicchio et al. | |
| 6,942,451 B1 | 9/2005 | Alexander et al. | |
| 7,625,121 B2 * | 12/2009 | Pettinato et al. | 384/99 |
| 2002/0067871 A1 * | 6/2002 | Bos et al. | 384/99 |

(Continued)

OTHER PUBLICATIONS

International Search Report and Written Opinion, PCT/US2010/062377, May 2, 2011.

*Primary Examiner* — Igor Kershteyn
(74) *Attorney, Agent, or Firm* — Krieg DeVault LLP (57) ABSTRACT

One embodiment of the present invention is a damping system for rotating machinery such as gas turbine engines. Other embodiments include apparatuses, systems, devices, hardware, methods, and combinations for damping systems. Further embodiments, forms, features, aspects, benefits, and advantages of the present application shall become apparent from the description and figures provided herewith.

21 Claims, 4 Drawing Sheets

(56) References Cited

U.S. PATENT DOCUMENTS

| | | |
|---|---|---|
| 2002/0076124 A1* | 6/2002 | Bos et al. ................. 384/99 |
| 2002/0127102 A1 | 9/2002 | Corattiyil et al. |
| 2003/0039538 A1 | 2/2003 | Allmon et al. |
| 2003/0189382 A1 | 10/2003 | Tornquist et al. |
| 2004/0042693 A1 | 3/2004 | Dubreuil et al. |
| 2007/0086685 A1 | 4/2007 | Klusman et al. |
| 2007/0248293 A1* | 10/2007 | Pettinato et al. ............. 384/99 |
| 2009/0263058 A1 | 10/2009 | Gibbons |

* cited by examiner

ROTATING MACHINERY WITH DAMPING SYSTEM

CROSS REFERENCE TO RELATED APPLICATIONS

The present application claims the benefit of U.S. Provisional Patent Application 61/290,702, filed Dec. 29, 2009, and is incorporated herein by reference.

GOVERNMENT RIGHTS

The present application was made with United States government support under Contract No. XQ2370220E awarded by the United States government. The United States government may have certain rights in the present application.

FIELD OF THE INVENTION

The present invention relates to rotating machinery such as gas turbine engines, and more particularly, to a damping system for use in rotating machinery.

BACKGROUND

Damping systems that effectively damp vibrations in rotating structures, such as rotor systems in a gas turbine engines or other rotating machinery, remain an area of interest. Some existing systems have various shortcomings, drawbacks, and disadvantages relative to certain applications. Accordingly, there remains a need for further contributions in this area of technology.

SUMMARY

One embodiment of the present invention is a damping system for rotating machinery such as gas turbine engines. Other embodiments include apparatuses, systems, devices, hardware, methods, and combinations for damping systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
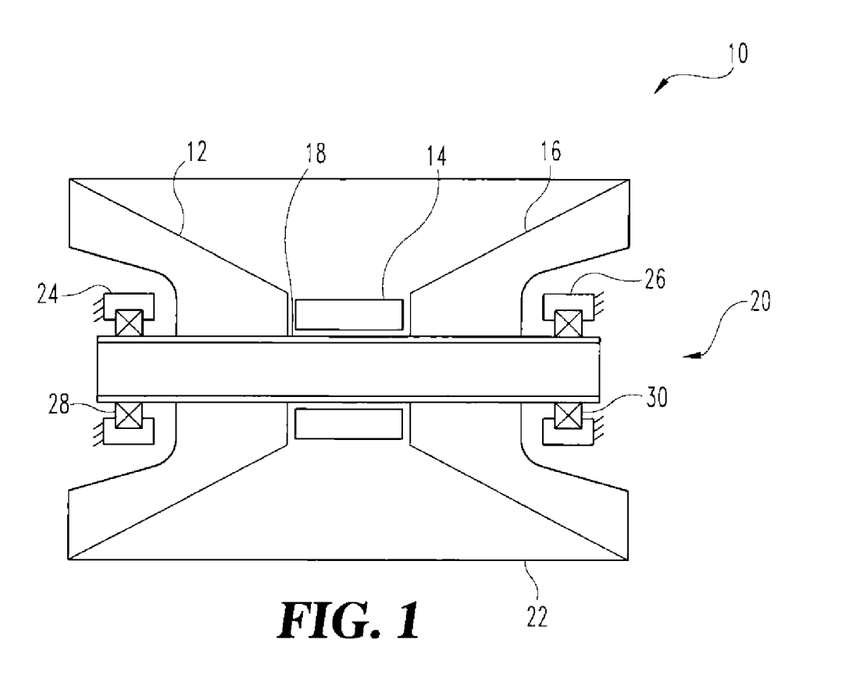
FIG. 1 schematically depicts a gas turbine engine in accordance with an embodiment of the present invention.

Referring now to the drawings, and in particular FIG. 1, there is shown a rotating machine in the form of a gas turbine engine 10. Although embodiments of the present invention are described herein with respect to a gas turbine engine, it will be understood that the present invention is also applicable to other types of rotating machines.

Gas turbine engine 10 includes a compressor 12, a combustor 14 and a turbine 16. Compressor 12 is mechanically coupled to turbine 16 via a shaft 18, which form a part of a rotor system 20. Combustor 14 is fluidly disposed between compressor 12 and turbine 16. Compressor 12, combustor 14 and turbine 16 are housed within and supported by an engine case system 22, which generally includes mounting features for mounting gas turbine engine 10 in an air vehicle, such as an aircraft or missile system.

Coupled to engine case system 22 are static structures, including a front bearing support 24 and an aft bearing support 26. Housed within front bearing support 24 is a rolling element bearing 28 which supports the front portion of rotor system 20, e.g., including compressor 12 and the front portion of shaft 18. Rolling element bearing 28 is a ball thrust bearing. In other embodiments of the present invention, it is alternatively considered that rolling element bearing 28 may be one or more of a roller bearing and/or other type of rolling element bearing. As a thrust bearing, rolling element bearing 28 transmits both thrust loads and radial loads from rotor system 20 into engine case system 22 via front bearing support 24.

Housed within aft bearing support 26 is a rolling element bearing 30 which supports the aft portion of rotor system 20, e.g., including turbine 16 and the aft portion of shaft 18. Rolling element bearing 30 is a roller bearing. It is alternatively considered that in other embodiments, rolling element bearing 30 may be one or more of a ball bearing and/or other type of rolling element bearing. Rolling element bearing 30 transmits radial loads from rotor system 20 into engine case system 22 via aft bearing support 26.

In the depiction of FIG. 1, each of rolling element bearing 28 and rolling element bearing 30 are depicted as being mounted directly on shaft 18. However, it will be understood that the depiction of FIG. 1 is schematic in nature and not representative of any particular scheme for mounting rolling element bearing 28 and rolling element bearing 30. Rather, embodiments of the present invention may incorporate one or more of many different possible mounting schemes.

During steady state operation of gas turbine engine 10, atmospheric air is drawn into and compressed by compressor 12. The compressed air is discharged from compressor 12 into combustor 14, where fuel is added to the compressed air and the mixture is ignited. The resulting hot gases are supplied to turbine 16, which extracts mechanical energy to drive compressor 12, and discharges the hot gases, e.g., in the form of jet thrust.

The operation of gas turbine engine 10 results in steady state and dynamic loads on rotor system 20, including aerodynamic, gyroscopic, rotor mass and unbalance loads. The rotor system 20 loads are transmitted by rolling element bearings 28 and 30 to engine case system 20.

Rotor system 20 aerodynamic loads include axial thrust loads. Aerodynamically imposed thrust loads may be tuned, in conjunction with the radial loads anticipated during engine operation, to optimize the life of the thrust bearing, i.e., rolling element bearing 28. For example, balance pistons (not shown) may be employed to achieve desired steady state thrust loads.

Gyroscopic loads occur when rotor system 20 is rotating at the same time engine 10 is rotated in a direction having a component axis of rotation inclined 90° from the axis of rotation of rotor system 20. Gyroscopic loading results in bending loads in rotor system 20 and radial loads, which are reacted by both rolling element bearing 28 and rolling element bearing 30.

Rotor mass loads result from the mass of rotor system 20 in conjunction with gravity and air vehicle acceleration in a direction perpendicular to the axis of rotation of rotor system 20. Depending on the acceleration experienced by the air vehicle in a direction perpendicular to the axis of rotation of rotor system 20, the rotor mass loads may be greater or lesser than the weight of rotor system 20. Rotor mass loads are radial loads, and are reacted by both rolling element bearing 28 and rolling element bearing 30.

Dynamic loads include both unbalance loads and critical rotor mode responses, both of which are reacted by both rolling element bearing 28 and rolling element bearing 30. Unbalance loads result primarily from manufacturing tolerances and wear of rotor system 20 components. Critical rotor mode responses may occur during startup of gas turbine engine 10 as rotor system 20 accelerates through critical speeds, i.e., rotor speeds corresponding to resonant frequencies of rotor system 20. The critical rotor mode responses may result in substantial dynamic radial loads. In order to damp the critical rotor mode responses as rotor system 20 passes through resonant frequencies, gas turbine engine 10 includes a damping system.

Figure 2:
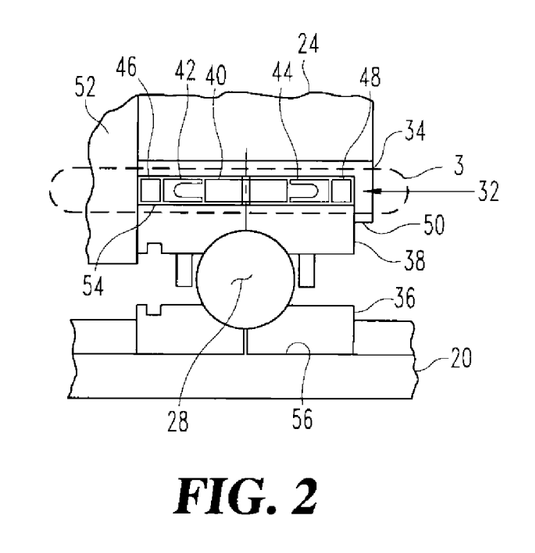
FIG. 2 is a cross section of a damping system in accordance with an embodiment of the present invention.

Referring now to FIG. 2, gas turbine engine 10 includes a squeeze film damping system 32 structured to damp vibrations passing from rotor system 20 through rolling element bearing 28 into a static structure. In one form, the static structure is front bearing support 24. In other embodiments, other static structures may be employed, e.g., including components affixed or coupled to bearing support 24 through which dynamic loads pass before or after reaching bearing support 24. A similar damping system may be structured to damp vibrations passing from rotor system 20 through rolling element bearing 30 into aft bearing support 26.

As depicted in FIG. 2, front bearing support 24 includes a bearing cage 34. Rolling element bearing 28 includes a split inner race 36 and a split outer race 38. Split outer race 38 of rolling element bearing 28 is subject to radial displacements during the operation of gas turbine engine 10. The radial displacements may result from critical rotor mode responses during startup of gas turbine engine 10. Radial displacements may also result from rotor system 20 unbalance loads and gyroscopically induced loads.

Damping system 32 includes a damper ring 40, a seal 42 disposed on one side of damper ring 40, a seal 44 disposed on the other side of damper ring 40, an isolator spring 46 disposed on one side of damper ring 40 and an isolator spring 48 disposed on the other side of damper ring 40. In one form, damping system 32 is a squeeze-film damping system. Damping system 32 and split outer race 38 are axially retained between an aft wall 50 of bearing cage 34 and a forward structure 52 affixed to front bearing support 24.

Figure 3:
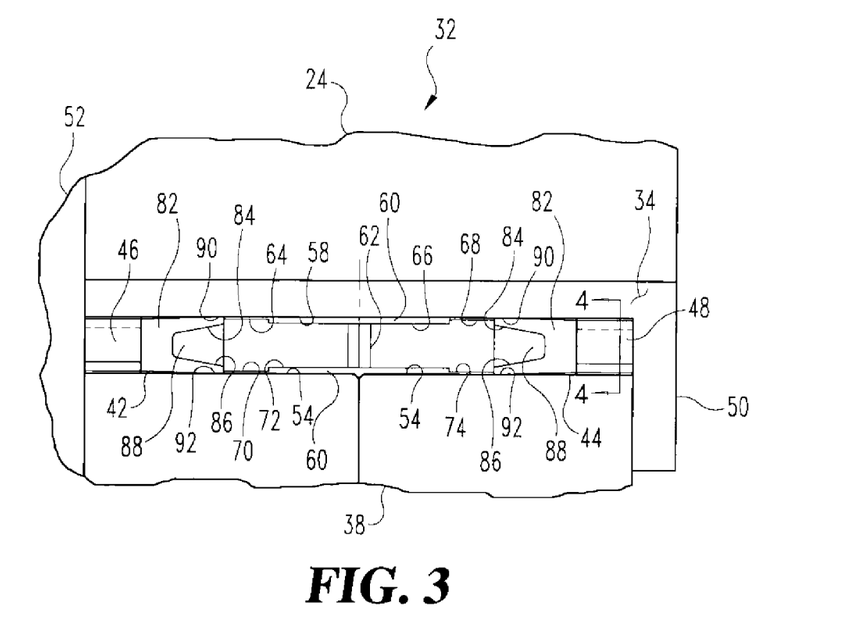
FIG. 3 is an enlarged cross section of the damping system of FIG. 2.

Referring now to FIG. 3 in conjunction with FIG. 2, damping system 32 is further described.

Split outer race 38 includes an outer race pilot surface 54 defined by an outer race pilot diameter. As a piloting feature, outer race pilot surface 54 is a radial positioning surface, which in the present embodiment radially positions split outer race 38. Split inner race 36 includes an inner race pilot surface 56 defined by an inner race pilot diameter. Bearing cage 34 includes a static inner piloting surface 58 defined by an inside pilot diameter.

Defined between outer race pilot surface 54 and static inner piloting surface 58 is a cavity 60. Damper ring 40, seal 42, seal 44, isolator spring 46 and isolator spring 48 are disposed within cavity 60. Cavity 60 is charged with a fluid, e.g., a viscous damping fluid, such as engine lubricating oil or a grease, which is employed in conjunction with damper ring 40 to provide damping. Cavity 60 may be charged with the damping fluid by a pressurized lubrication system (not shown) of gas turbine engine 10.

Damper ring 40 includes a plurality of fluid transfer holes 62 disposed about the circumference of damper ring 40, which help to distribute the damping fluid about the inner and outer periphery of damper ring 40. The damping fluid may be supplied by a passage (not shown) through bearing cage 34.

Damper ring 40 is an annular squeeze film damper ring, and is structured to provide damping of rotor system 20 based on the radial displacements of split outer race 38 that result from critical rotor mode responses, e.g., during the startup of gas turbine engine 10. In particular, damper ring 40 is operative to provide viscous damping of radial loads generated in rotor system 20 using the viscous damping fluid, based on clearances between damper ring 40, inner piloting surface 58 of bearing cage 34 and outer race piloting surface 54 of rolling element bearing 28.

Damper ring 40 is a dual-sided damper ring, and includes damper clearance surfaces 64, 66, 68, 70, 72 and 74. Damper clearance surfaces 64, 66, 68, 70, 72 and 74 are diametrically sized to provide a predetermined amount of damping in conjunction with the diameters of outer race pilot surface 54 of split outer race 38 and inner piloting surface 58 of bearing cage 34. Being a dual-sided damper ring, damping is performed based on the diametral clearance between damper clearance surfaces 64, 66 and 68 of damper ring 40 and inner piloting surface 58 of bearing cage 34, and damping is also performed based on the diametral clearance between damper clearance surfaces 70, 72 and 74 of damper ring 40 and outer race pilot surface 54 of rolling element bearing 28. Damping is thus performed on both sides of damper ring 40.

For example, because rotor system 20 is spinning during the operation of gas turbine engine 10, the radial displacement resulting from the critical rotor mode responses of rotor system 20 generates an orbital motion in split outer race 38. That is, the radial displacement of split outer race 38 rotates approximately about the axis of revolution of rotor system 20. The orbiting radial displacement of split outer race 38 results in a rotating front of oil being "squeezed" between outer race pilot surface 54 of split outer race 38 and damper ring 40, and between damper ring 40 and static inner piloting surface 58 of bearing cage 34, which provides viscous damping due to the viscosity characteristic of the fluid in cavity 60. In other embodiments, a single-sided damper ring may be employed.

In one form, a centering force to center split outer race 38 relative to bearing cage 34 is provided by each of isolator spring 46 and isolator spring 48. In one form, isolator spring 46 and isolator spring 48 are annular springs, each having alternating contact between inner piloting surface 58 of bearing cage 34 and outer race pilot surface 54 of rolling element bearing 28. In other embodiments, other types of springs may be employed. Isolator spring 46 and isolator spring 48 absorb the radial displacement of rolling element bearing 28 relative to bearing cage 34. The inclusion of one or more isolator springs allows for dynamic tuning. For example, in some embodiments, isolator spring 46 and/or isolator spring 48 may be used to alter the stiffness of the bearing support system, e.g., in which case the stiffness of isolator spring 46 and/or isolator spring 46 are selected so as to tune the dynamic characteristics of the bearing support system.

Figure 4:
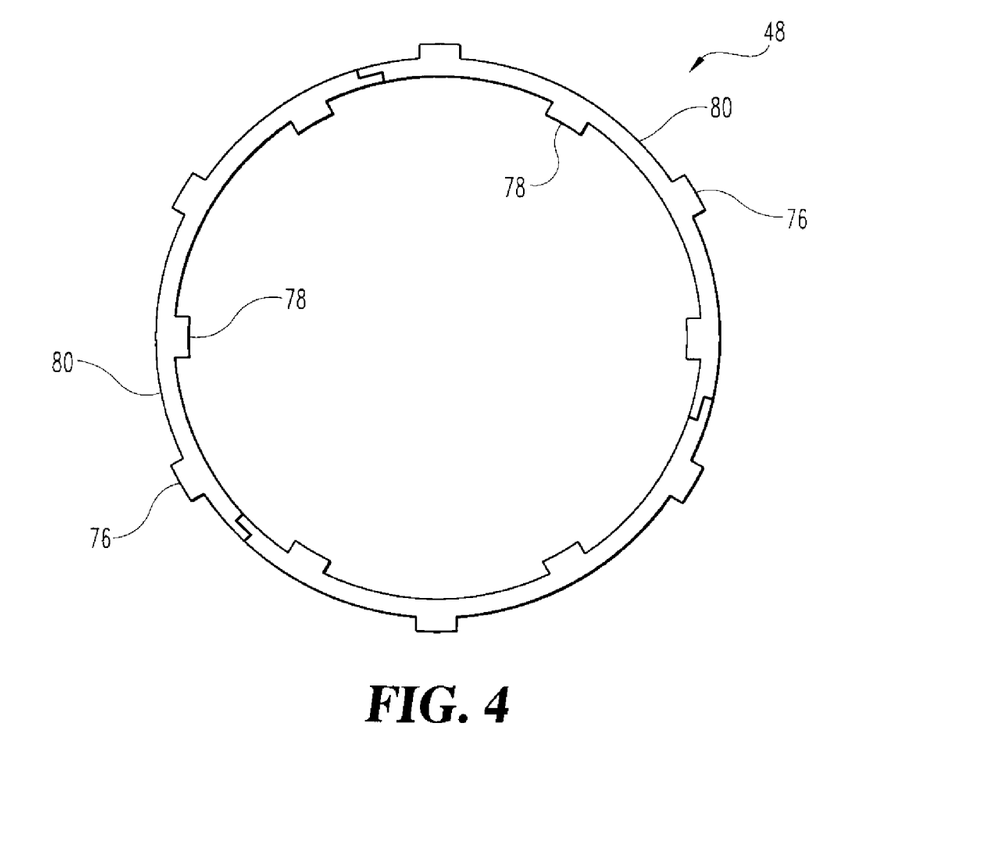
FIG. 4 is a cross sectional view of an isolator spring employed in the damping system embodiment of FIG. 2.

For example, referring now to FIG. 4, a cross section through isolator spring 48 is depicted. Isolator spring 46 is structured similar to isolator spring 48. In one form, isolator springs 46 and 48 are segmented rings. In other embodiments, isolator springs 46 and 48 may be split rings or may be continuous rings. In still other embodiments, isolator springs 46 and 48 may take other forms. Isolator spring 48 includes a plurality of outer contact portions 76, a plurality of inner contact portions 78, and a flexural portion 80 disposed between each outer contact portion 76 and inner contact portion 78. Outer contact portions 76 are piloted by inner piloting surface 58 of bearing cage 34. Inner contact portions 78 are piloted by outer race pilot surface 54 of split outer race 38. Radial excursions of split outer race 38 displace inner contact portions 78 relative to outer contact portions 76, resulting in deflection of flexural portions 80, which generates restoring forces in a direction opposite the direction of deflection.

Although the present embodiment employs two (2) isolator springs 46 and 48, it is alternatively contemplated that other embodiments may employ fewer or greater numbers of isolator springs, or may not include any such isolator springs.

Referring again to FIG. 3, in one form, each of seals 42 and 44 is pressure assisted, i.e., a self-charging seal, wherein the pressure of the fluid sought to be sealed assists in maintaining contact between the relevant sealing surfaces. In other embodiments, other seal types may be employed. Each of seals 42 and 44 are structured to receive charging pressure from the damping fluid contained in cavity 60. Seals 42 and 44 are polymeric in the present embodiment, e.g., a polyimide, although other materials may be employed in other embodiments of the present invention. By employing seals 42 and 44 to seal against the same surfaces employed for damping via damper ring 40, e.g., piloting surfaces 54 and 58, the envelope requirements and costs associated with seal glands for other seal arrangements may be avoided.

Each of seals 42 and 44 are bifurcated seals disposed adjacent to damper ring 40, and include a body 82, an outer leg 84, an inner leg 86, and a hollow 88 defined between body 82, outer leg 84 and inner leg 86. Each outer leg 84 extends from body 82, and includes a sealing surface 90 disposed thereon and positioned in proximity to inner piloting surface 58 of bearing cage 34. Sealing surface 90 is structured to seal against static inner piloting surface 58, i.e., at the bearing cage 34 inner pilot diameter. Each inner leg 86 extends from body 82, and includes a sealing surface 92 disposed thereon and positioned in proximity to outer race pilot surface 54 of rolling element bearing 28. Sealing surface 92 is structured to seal against outer race pilot surface 54, i.e., at the outer race pilot diameter of split outer race 38.

Each hollow 88 is open to cavity 60, and exposes outer leg 84 and inner leg 86 to the pressure of the damping fluid surrounding damper ring 40 in cavity 60. The pressure of the damping fluid acts on outer leg 84 and inner leg 86 in the direction of sealing surface 90 and sealing surface 92, respectively, during the operation of gas turbine engine 10. This pressure helps to retain sealing surface 90 and sealing surface 92 in sealing contact with inner piloting surface 58 of bearing cage 34 and outer race pilot surface 54 of rolling element bearing 28, respectively, during the operation of gas turbine engine 10. The pressure thus assists seals 42 and 44 in retaining the damping fluid in cavity 60, which is used by damper clearance surfaces 64, 66, 68, 70, 72 and 74 of damper ring 40 in conjunction with the diameters of outer race pilot surface 54 of split outer race 38 and inner piloting surface 58 of bearing cage 34 in providing squeeze film damping of rotor system 20.

Although the illustrated embodiment of damping system 32 is disposed between split outer race 38 and bearing cage 34 in the present embodiment, it is alternatively contemplated that damping system 32 may be disposed between split inner race 36 and a portion of rotor system 20 in other embodiments. In still other embodiments, it is contemplated that other gas turbine engine 10 components may be intermediately disposed between split outer race 38 and damper ring 40 and/or between damper ring 40 and bearing cage 34, in which case damping is performed based on the damping fluid surrounding damper ring 40 in conjunction with the clearances between damper ring 40 and any such intermediately disposed components. In yet other embodiments, it is contemplated that damping system 32 may be employed for intershaft damping, wherein damping is performed between two or more rotor systems.

An embodiment of the present invention may include a rotating machine with a first component having a first component surface subject to radial displacement during operation of the rotating machine. The first component surface may be defined by a first diameter. The second component may have a second component surface spaced apart from the first component surface. The second component surface may be defined by a second diameter different from the first diameter. A squeeze film damper disposed in a cavity may be defined between the first component surface and the second component surface. The squeeze film damper may be structured to provide damping based on the radial displacement. A seal disposed adjacent to the squeeze film damper may have a seal having a first sealing surface and a second sealing surface. The first sealing surface may be structured to seal against the first component surface at the first diameter. The second sealing surface may be structured to seal against the second component surface at the second diameter.

In one refinement of the embodiment a squeeze film damper is structured as an annular squeeze film damper ring.

In another refinement of the embodiment the seal is a self-charging seal.

In another refinement of the embodiment the seal is structured to receive a charging pressure from damping fluid in said cavity.

In another refinement of the embodiment the seal is a bifurcated seal having a first leg and a second leg. The first sealing surface is disposed on the first leg and the second sealing surface is disposed on the second leg.

In another refinement of the embodiment the seal includes a hollow defined between the first leg and the second leg. The hollow is open to the cavity.

In another refinement of the embodiment the first component is a portion of a rolling element bearing. The second component is a static bearing support structure of the rotating machine.

In another refinement of the embodiment the first component is one of an inner race and an outer race of the rolling element bearing. The first diameter is the one of a corresponding inner race pilot diameter and outer race pilot diameter of the rolling element bearing.

In another refinement of the embodiment the squeeze film damper is a dual sided damper ring structured to perform damping on both sides of the dual sided damper ring.

In another refinement of the embodiment the cavity is charged with a fluid that is employed in conjunction with the squeeze film damper to provide the damping.

Another embodiment of the present invention may include a gas turbine engine. The gas turbine engine may include a rotating engine structure, a static engine structure having a static structure pilot diameter, and a rolling element bearing structured to transmit a load from the rotating engine structure to the static engine structure. The rolling element bearing may have an inner race and an outer race. The inner race may have an inner race pilot diameter and the outer race may have an outer race pilot diameter. The static structure pilot diameter and one of the inner race pilot diameter and the outer race pilot diameter form a cavity and a damping system for damping the load. The damping system may include a squeeze film damper disposed in the cavity. The cavity also may contain a viscous damping fluid. The squeeze film damper may be operative to provide viscous damping of the load using the viscous damping fluid based on clearances between the static engine structure at the static structure pilot diameter and the rolling element bearing at the one of the inner race pilot diameter and the outer race pilot diameter. A seal may be disposed at least partially in the cavity. The seal may have a first sealing surface and a second sealing surface. The first sealing surface may be structured to seal against the static engine structure at the static structure pilot diameter. The second sealing surface may be structured to seal against the rolling element bearing at the one of the inner race pilot diameter and the outer race pilot diameter.

In a refinement of the embodiment the gas turbine engine may include an isolator spring disposed in the cavity and piloted by the static engine structure at the static structure pilot diameter and the rolling element bearing at the one of the inner race pilot diameter and the outer race pilot diameter. The isolator sprint is structured to absorb radial displacement between the rolling element bearing and the static engine structure.

In another refinement of the embodiment the isolator spring may be an annular spring having alternating contact between the static structure at the static structure pilot diameter and the rolling element bearing at the one of the inner race pilot diameter and the outer race pilot diameter.

In another refinement of the embodiment the seal may be a self-charging seal.

In another refinement of the embodiment the seal may be structured to receive a charging pressure from the viscous damping fluid in the cavity.

In another refinement of the embodiment the seal may be a bifurcated seal having a first leg and a second leg. The first sealing surface may be on the first leg. The second sealing surface may be disposed on the second leg.

In another refinement of the embodiment the seal may include a hollow defined between the first leg and the second leg. The hollow may open to the cavity.

In another refinement of the embodiment the squeeze film damper may be operative to provide viscous damping of the load using the viscous damping fluid based on clearances between the static engine structure at the static structure pilot diameter and the rolling element bearing at the outer race pilot diameter.

Another embodiment of the present invention may be a rotating machine which may include a rotating structure, a static structure having a static structure pilot diameter, and a rolling element bearing structured to transmit a variable load from the rotating structure to the static structure. The rolling element bearing may have an inner race and an outer race. The inner race may have an inner race pilot diameter and the outer race may have an outer race pilot diameter. The static structure pilot diameter and one of the inner race pilot diameter and the outer race pilot diameter may form a cavity therebetween for damping the variable load and for sealing the means for damping. The sealing may be operative to seal between the static structure pilot diameter and the one of the inner race pilot diameter and the outer race pilot diameter.

In a refinement of the embodiment the rotating machine may include a means for absorbing radial displacement between the static structure pilot diameter and the one of the inner race pilot diameter and the outer race pilot diameter.

Another embodiment of the present invention may be a damper system for rotating machinery which may include a squeeze film damper disposed in a cavity defined between a diameter of a static structure of the rotating machinery and one of an inner race diameter and an outer race diameter of a rolling element bearing of the rotating machinery. The cavity also may contain a viscous damping fluid. The squeeze film damper may be operative to provide viscous damping of a load using the viscous damping fluid based on clearances between the static structure diameter and the one of the inner race diameter and the outer race diameter. The embodiment may also include a seal disposed at least partially in the cavity. The seal may have a first sealing surface and a second sealing surface. The first sealing surface may be structured to seal against the static structure at the diameter of the static structure. The second sealing surface may be structured to seal against the rolling element bearing at the one of the inner race diameter and the outer race diameter.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A rotating machine, comprising:
a first component having a first component surface subject to radial displacement during operation of said rotating machine, said first component surface being defined by a first diameter;
a second component having a second component surface spaced apart from said first component surface, said second component surface being defined by a second diameter different from said first diameter;
a squeeze film damper disposed in a cavity defined between said first component surface and said second component surface, said squeeze film damper being structured to provide damping based on said radial displacement; and
a seal disposed adjacent to said squeeze film damper, said seal having a first sealing surface and a second sealing surface, wherein said first sealing surface is structured to seal against said first component surface at said first diameter, and wherein said second sealing surface is structured to seal against said second component surface at said second diameter.

2. The rotating machine of claim 1, wherein said squeeze film damper is structured as an annular squeeze film damper ring.

3. The rotating machine of claim 1, wherein said seal is a self-charging seal.

4. The rotating machine of claim 3, wherein said seal is structured to receive a charging pressure from damping fluid in said cavity.

5. The rotating machine of claim 1, wherein said seal is a bifurcated seal having a first leg and a second leg; wherein said first sealing surface is disposed on said first leg; and wherein said second sealing surface is disposed on said second leg.

6. The rotating machine of claim 5, wherein said seal includes a hollow defined between said first leg and said second leg, and wherein said hollow is open to said cavity.

7. The rotating machine of claim 1, wherein said first component is a portion of a rolling element bearing; and wherein said second component is a static bearing support structure of said rotating machine.

8. The rotating machine of claim 7, wherein said first component is one of an inner race and an outer race of said rolling element bearing, and wherein said first diameter is said one of a corresponding inner race pilot diameter and outer race pilot diameter of said rolling element bearing.

9. The rotating machine of claim 1, wherein said squeeze film damper is a dual sided damper ring structured to perform damping on both sides of said dual sided damper ring.

10. The rotating machine of claim 1, wherein said cavity is charged with a fluid that is employed in conjunction with said squeeze film damper to provide said damping.

11. A gas turbine engine, comprising:
a rotating engine structure;
a static engine structure having a static structure pilot diameter;
a rolling element bearing structured to transmit a load from said rotating engine structure to said static engine structure, said rolling element bearing having an inner race and an outer race, said inner race having an inner race pilot diameter and said outer race having an outer race pilot diameter, wherein said static structure pilot diameter and one of said inner race pilot diameter and said outer race pilot diameter form a cavity therebetween; and
a damping system for damping said load, said damping system including:
a squeeze film damper disposed in said cavity, said cavity also containing a viscous damping fluid, wherein said squeeze film damper is operative to provide viscous damping of said load using said viscous damping fluid based on clearances between said static engine structure at said static structure pilot diameter and said rolling element bearing at said one of said inner race pilot diameter and said outer race pilot diameter; and
a seal disposed at least partially in said cavity, said seal having a first sealing surface and a second sealing surface, wherein said first sealing surface is structured to seal against said static engine structure at said static structure pilot diameter, and wherein said second sealing surface is structured to seal against said rolling element bearing at said one of said inner race pilot diameter and said outer race pilot diameter.

12. The gas turbine engine of claim 11, further comprising an isolator spring disposed in said cavity and piloted by said static engine structure at said static structure pilot diameter and said rolling element bearing at said one of said inner race pilot diameter and said outer race pilot diameter, wherein said isolator spring is structured to absorb radial displacement between said rolling element bearing and said static engine structure.

13. The gas turbine engine of claim 12, wherein said isolator spring is an annular spring having alternating contact between said static engine structure at said static structure pilot diameter and said rolling element bearing at said one of said inner race pilot diameter and said outer race pilot diameter.

14. The gas turbine engine of claim 11, wherein said seal is a self-charging seal.

15. The gas turbine engine of claim 14, wherein said seal is structured to receive a charging pressure from said viscous damping fluid in said cavity.

16. The gas turbine engine of claim 11, wherein said seal is a bifurcated seal having a first leg and a second leg; wherein said first sealing surface is disposed on said first leg; and wherein said second sealing surface is disposed on said second leg.

17. The gas turbine engine of claim 16, wherein said seal includes a hollow defined between said first leg and said second leg, and wherein said hollow is open to said cavity.

18. The gas turbine engine of claim 11, wherein said squeeze film damper is operative to provide viscous damping of said load using said viscous damping fluid based on clearances between said static engine structure at said static structure pilot diameter and said rolling element bearing at said outer race pilot diameter.

19. A rotating machine, comprising:
a rotating structure;
a static structure having a static structure pilot diameter;
a rolling element bearing structured to transmit a variable load from said rotating structure to said static structure, said rolling element bearing having an inner race and an outer race, said inner race having an inner race pilot diameter and said outer race having an outer race pilot diameter, wherein said static structure pilot diameter and one of said inner race pilot diameter and said outer race pilot diameter form a cavity therebetween;
means for damping said variable load; and
means for sealing said means for damping, said means for sealing being operative to seal between said static structure pilot diameter and said one of said inner race pilot diameter and said outer race pilot diameter.

20. The rotating machine of claim 19, further comprising means for absorbing radial displacement between said static structure pilot diameter and said one of said inner race pilot diameter and said outer race pilot diameter.

21. A damper system for rotating machinery, comprising:
a squeeze film damper disposed in a cavity defined between a diameter of a static structure of said rotating machinery and one of an inner race diameter and an outer race diameter of a rolling element bearing of said rotating machinery, said cavity also containing a viscous damping fluid, wherein said squeeze film damper is operative to provide viscous damping of a load using said viscous damping fluid based on clearances between said static structure diameter and said one of said inner race diameter and said outer race diameter; and
a seal disposed at least partially in said cavity, said seal having a first sealing surface and a second sealing surface, wherein said first sealing surface is structured to seal against said static structure at said diameter of said static structure, and wherein said second sealing surface is structured to seal against said rolling element bearing at said one of said inner race diameter and said outer race diameter.

\* \* \* \* \*